US008973672B2

(12) United States Patent
Fraederich

(10) Patent No.: US 8,973,672 B2
(45) Date of Patent: Mar. 10, 2015

(54) DEVICE FOR TRIGGERING A FIRE EXTINGUISHING SYSTEM BY MEANS OF A SPRINKLER

(75) Inventor: Henning Fraederich, Lübeck (DE)

(73) Assignee: Minimax GmbH & Co. KG, Bad Oldesloe (DE)

( * ) Notice: Subject to any disclaimer, the term of this patent is extended or adjusted under 35 U.S.C. 154(b) by 245 days.

(21) Appl. No.: 13/472,043

(22) Filed: May 15, 2012

(65) Prior Publication Data

US 2012/0318536 A1 Dec. 20, 2012

(30) Foreign Application Priority Data

May 31, 2011 (DE) ......................... 10 2011 076 798

(51) Int. Cl.

*A62C 37/08* (2006.01)
*A62C 37/36* (2006.01)
*F16K 31/44* (2006.01)
*A62C 37/42* (2006.01)

(52) U.S. Cl.

CPC ................ *A62C 37/42* (2013.01); *Y10S 169/03* (2013.01)
USPC ................... 169/40; 169/37; 169/41; 169/42; 169/DIG. 3; 251/280

(58) Field of Classification Search

CPC ........ A62C 31/02; A62C 35/62; A62C 37/14; A62C 37/08; A62C 37/42
USPC ............. 169/17, 37–42, 58, DIG. 3; 251/228, 251/229, 280; 74/520
See application file for complete search history.

(56) References Cited

U.S. PATENT DOCUMENTS

| | | | | |
|---|---|---|---|---|
| 556,947 | A * | 3/1896 | Westbrook | 169/5 |
| 1,397,704 | A * | 11/1921 | Rockwood | 169/21 |
| 1,900,262 | A * | 3/1933 | Tyden | 169/17 |
| 3,135,331 | A * | 6/1964 | Lee | 169/17 |
| 3,584,689 | A * | 6/1971 | Willms | 169/17 |
| 4,220,208 | A * | 9/1980 | Jackson et al. | 169/17 |
| 7,383,892 | B2 * | 6/2008 | Jackson | 169/16 |
| 7,802,628 | B1 | 9/2010 | Silva, Jr. et al. | |
| 2003/0075343 | A1 * | 4/2003 | Ballard | 169/37 |
| 2007/0007020 | A1 * | 1/2007 | Chase | 169/57 |
| 2010/0038099 | A1 * | 2/2010 | Thompson et al. | 169/37 |

FOREIGN PATENT DOCUMENTS

| | | | |
|---|---|---|---|
| CH | 662281 | A5 | 9/1987 |
| DE | 2826141 | A1 | 12/1979 |
| DE | 4320443 | A1 | 12/1994 |
| DE | 69900364 | T2 | 5/2002 |
| DE | 102005043213 | A1 | 3/2007 |
| SU | 1025435 | A1 | 6/1983 |

* cited by examiner

*Primary Examiner* — Len Tran
*Assistant Examiner* — Thomas Berez
(74) *Attorney, Agent, or Firm* — Harness, Dickey & Pierce, P.L.C.

(57) ABSTRACT

A device is provided for triggering a fire extinguishing system by a sprinkler, the device being arranged between the pipe for the extinguishing agent and the sprinkler and including a multiple-armed toggle-lever joint acting between a load axis of the triggering element and a sealing element that is arranged at an angle of 80 to 120° thereto. The device has the advantage that dry pipe sprinklers whose glass bulbs can only absorb low mechanical forces can also be arranged for use with pipes that exhibit large entry cross-sections, large volume flows and high pressures as the forces from the pipe that arise have to be absorbed only in part by the sprinkler glass bulb. It is further advantageous that the sealing force of the sealing element can be adjusted by means of an actuator.

11 Claims, 2 Drawing Sheets

DEVICE FOR TRIGGERING A FIRE EXTINGUISHING SYSTEM BY MEANS OF A SPRINKLER

CROSS-REFERENCE TO RELATED APPLICATIONS

Figure 1:
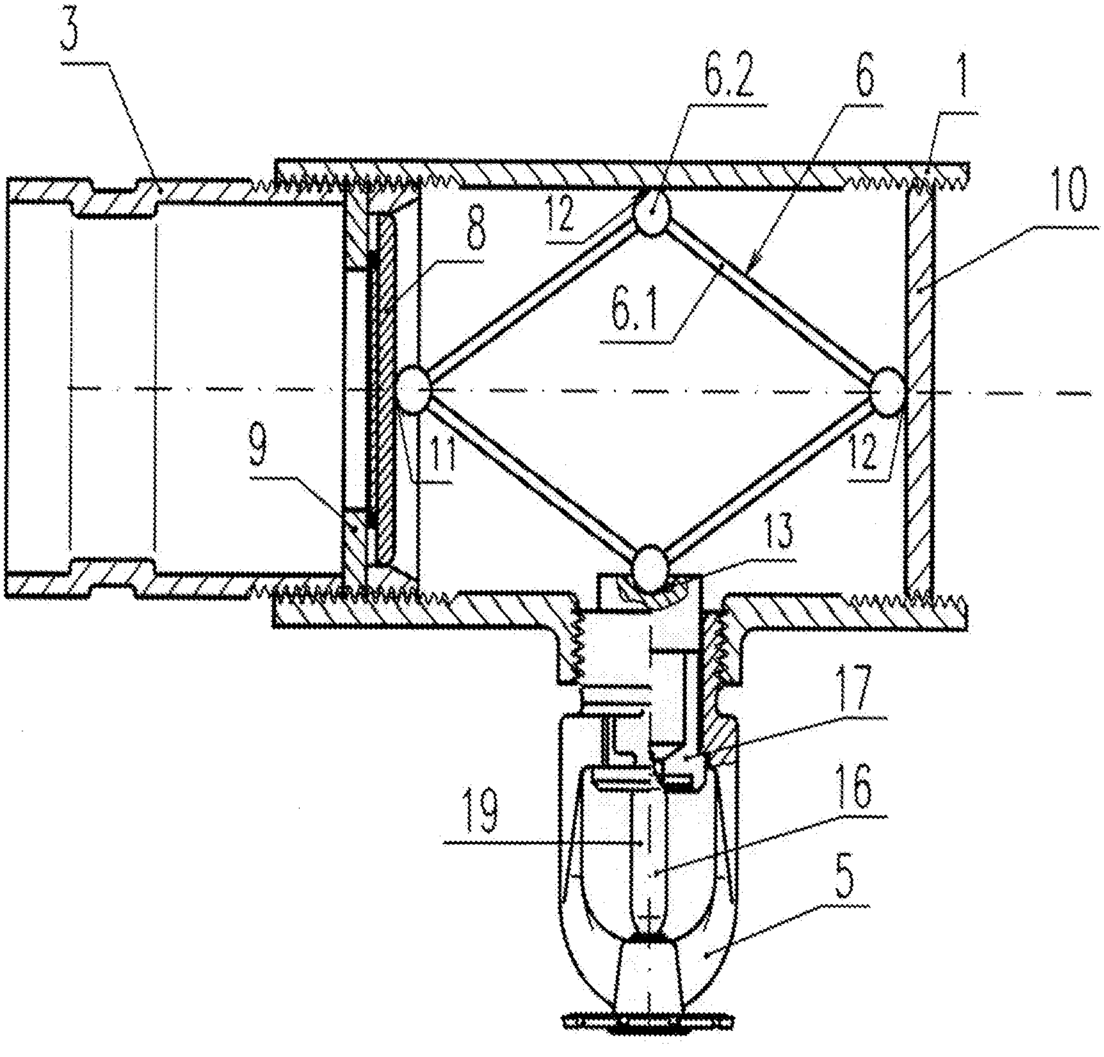

This application claims the benefit and priority of German Application No. DE 10 2011 076 798.3, filed May 31, 2011. The entire disclosure of the above application is incorporated herein by reference.

FIELD

The present disclosure relates to a device for triggering a fire extinguishing system by means of a sprinkler.

The device of the present disclosure can be used wherever sprinkler systems, in particular sprinkler dry pipe systems, are present. This is the case in areas at risk of frost or in areas with very high temperatures.

BACKGROUND

Pipes of sprinkler dry pipe systems are filled with compressed air or inert gas. Water does not get into the pipe network until after a sprinkler has been opened.

Suspended sprinklers, in particular for areas of a sprinkler system at risk of frost, are for example known from DE 28 26 141 A1. So that water can leave the open sprinkler even at low temperatures, filling materials such as granules, liquid, alcohol or brine can be fed into the pipe network upstream from the sprinkler so as to ensure that the water for firefighting can exit without any problems. In the document mentioned above, a solution is described where loose granules are arranged in the drop pipe of the sprinkler and discharged with the extinguishing water after the sprinkler has been triggered.

DE 10 2005 043213 B4 describes a sprinkler system for areas at risk of frost or cooled areas where water for firefighting and antifreeze are present in the pipes to the sprinkler, antifreeze being arranged in the lower part of the drop pipe upstream from the sprinkler in the area at risk of frost.

It is also common to use dry pipe sprinklers whose feed pipes are empty and without pressure. The water port is sealed mechanically by means of a rod or a pipe directly by the glass bulb arranged opposite that bursts at a certain temperature. The mechanically operated dry pipe sprinklers are preferred in practice since here there is no danger that water enters without being noticed which could lead the dry pipe sprinkler to fail at low temperatures.

Lever mechanisms in the context of fire extinguishing systems are basically known for dry alarm valves for sprinkler pipe networks and described for example in DE 43 20 443 C2 and DE 699 003 64 T2. Dry alarm valves in a sprinkler pipe network serve to separate the low air/gas pressure of the pipe network from the high pressure of the water supply and to release the valve to the water supply by means of a lever mechanism when the pressure in the sprinkler pipe network drops after opening a sprinkler, thus allowing extinguishing water to flow to the sprinklers.

A lever mechanism is also known for triggering a sprinkler. CH 662281 A for example describes a sprinkler where a lever arrangement serves as a triggering mechanism for a sprinkler.

U.S. Pat. No. 7,802,628 B1 reveals a lever mechanism at the upper end of a drop pipe that releases an opening in the extinguishing-water pipe when the sprinkler glass bulb is triggered.

US 2010/0038099 describes and illustrates a device for triggering a fire extinguishing system by means of a sprinkler, the device being arranged between the pipe for the extinguishing agent and the sprinkler. The device consists of a multiple-armed joint that deflects a force over the axis of a disk. However, the joint that has been described and illustrated is not a toggle-lever joint since the effects of a toggle lever (translation of a force or a distance)are not fulfilled by this device. Rather, the motion or the force is simply directed into a different direction by the device.

Although SU 1025435A shows a toggle lever joint that is arranged between a sprinkler and the associated deflector, this toggle-lever joint, too, is not a toggle-lever joint that is arranged between a sprinkler and a pipe for the extinguishing agent.

SUMMARY

In recent developments, sprinkler glass bulbs or triggering elements only have a small diameter. The openings, to the pipes are always increasing in size in favor of the desired higher flow rates which results in the triggering elements having a small diameter that can no longer be used as they could burst due to the pressure in the pipe before reaching their triggering temperature.

The solutions that have been mentioned do not show any possibilities of fitting a dry sprinkler in a pipe network having a large entry cross-section to a sprinkler with a glass bulb having a small diameter.

It is therefore the object of the present disclosure to develop a device for triggering a fire extinguishing system by means of a sprinkler, wherein the force that results from the pressure in the extinguishing system and is above the load capacity of the supporting heat-sensitive element can be reduced so that the load to be supported that acts on the heat sensitive element does not prematurely trigger the heat-sensitive element.

The present disclosure provides a device for triggering a fire extinguishing system by means of a sprinkler, the device being arranged between the pipe for the extinguishing agent and the sprinkler. According to the disclosure, this is a multiple-armed toggle-lever joint that is arranged between the load axis of the triggering element and a sealing element and at an angle of between 100° and 80°, preferably at approximately right angles.

The load axis of the triggering element approximately corresponds to the axis of symmetry of the perpendicularly suspended sprinkler.

A multiple-armed toggle-lever joint is to be understood to mean a multiple-armed joint that translates a force or a distance, that is to say, that a change in the acting force or the distance is achieved by means of the toggle-lever joint. In this way, the acting force can be increased or reduced or a distance can be shortened or lengthened by means of the toggle-lever joint.

The sealing element closes the pipe for the extinguishing agent in a gas-tight manner. This can be a valve plate against which the multiple-armed toggle-lever joint acts.

It is advantageous to arrange a setting unit opposite the sealing element or the valve plate. This can be a setting screw at the opposite end wall. Other suitable units that serve to set the pressure on the valve plate can be envisaged.

The toggle-lever joint can be a multiple-armed joint such as a twin- or four-armed toggle-lever joint. The four-armed toggle-lever joint consists of four articulated arms and four articulated connections. The articulated arms and the articulated connections are in each case arranged opposite each other so that the toggle-lever joint forms a type of parallelogram.

It is advantageous to design the joint connections as punctiform connections that in each case act centrally against their supports. It is also conceivable to have hinge-like joints or a combination of hinge-like and/or punctiform joint connections. The hinge connections can be arranged horizontally or at right angles on the supports or supporting surfaces. The articulated arms can be rods or pipes constructed from steel, plastic or a light metal.

In each case arranged opposite are the articulated connections that act on the closure of the sprinkler and on the body, and the articulated connections that act on the sealing element or the valve plate and the setting unit or the body wall.

It is advantageous to arrange a drop pipe and a support pipe between the sprinkler and the toggle-lever joint. As a result, the sprinkler can be arranged for example on a side of a wall and the pipe on the other side of a wall.

It is furthermore advantageous to arrange the multiple-armed toggle-lever joint in a T-shaped body.

In addition, it is regarded as being advantageous to arrange an adapter at the pipe for the extinguishing agent.

The present disclosure has the advantage that dry pipe sprinklers whose glass bulbs can absorb only low mechanical forces can also be arranged for use with pipes that exhibit large entry cross sections, large volume flows and high pressures, as the forces from the pipe that arise have to be absorbed only in part by the sprinkler glass bulb. It is also advantageous that the sealing force of the sealing element can be adjusted by an actuator.

DRAWINGS

Figure 2:
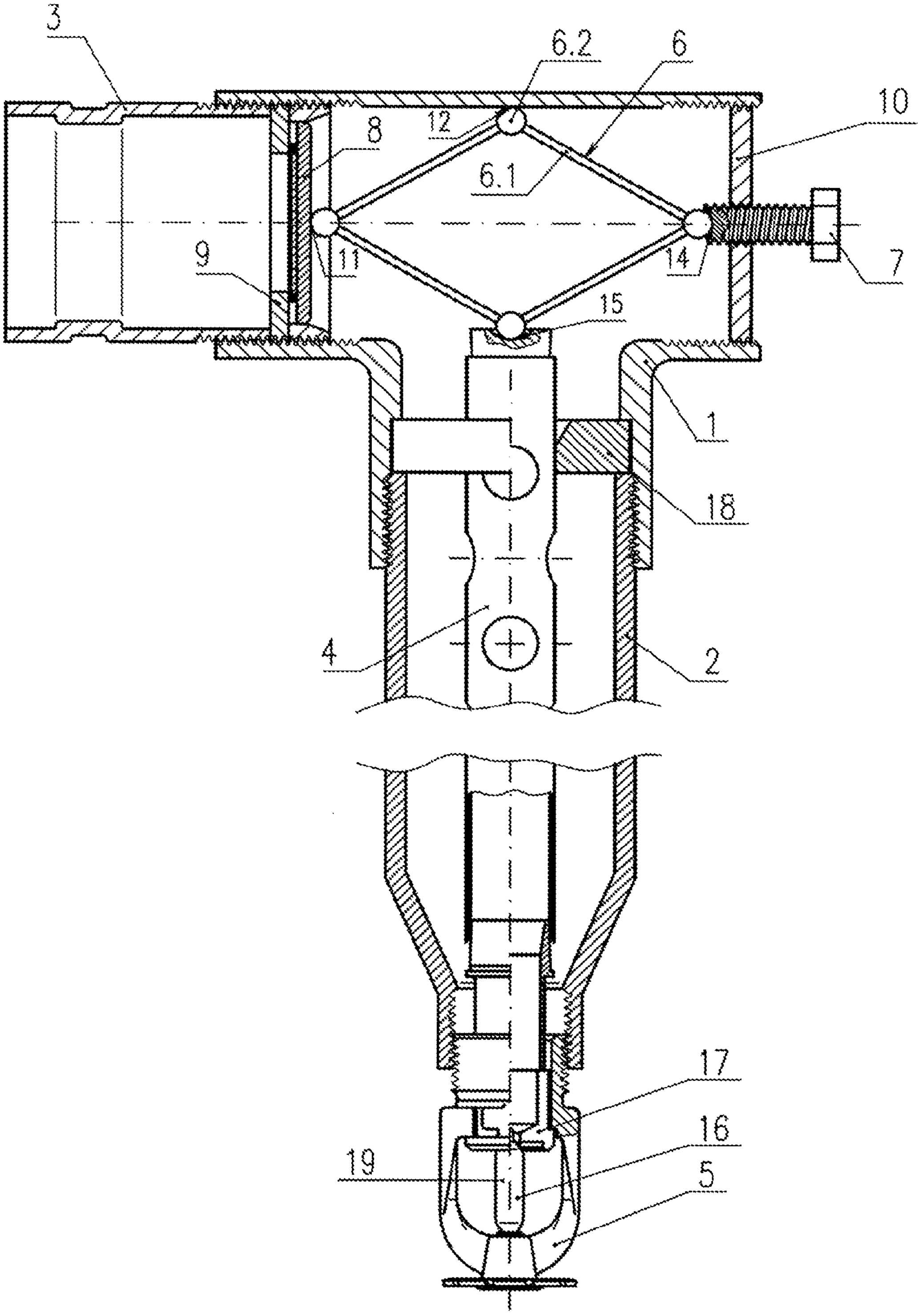

The present disclosure is to be explained below in more detail using an exemplary embodiment and two figures. In the figures:

FIG. 1 is a device for triggering a fire extinguishing system where a sprinkler is directly screwed into the device, in a schematic sectional representation; and FIG. 2 is an illustration of the device of FIG. 1 having a drop pipe and a supporting pipe between the sprinkler and the triggering device.

DETAILED DESCRIPTION

FIG. 1 shows the device for triggering a fire extinguishing system at an adapter 3 onto which the T-shaped body 1 is screwed. The body 1 with the valve seat 9 at the adapter 3 is closed by the valve plate 8 against which the toggle-lever joint 6 is acting. A seal ring can be disposed between the valve plate 8 and the valve seat 9. The toggle-lever joint 6 consists of four oppositely lying articulated rigid arms 6.1 having pivoting articulated connections 6.2 that interact in the shape of a parallelogram. Each of the pivoting connections 6.2 are restrained to pivot in a single plane so as to provide a rigid structure when all four connections 6.2 are restrained from moving outward. The articulated connections 6.2 act against the respective supports 11, 12, 13, 14, 15 that are arranged at the body 1, the disk 10, the valve plate 8 and the closure 17 at the sprinkler 5 (see also FIG. 2). As the triggering element, the sprinkler 5 possesses a glass bulb 16 that bursts as a result of the expansion of the liquid in it when a certain temperature is reached allowing the opening of the closure 17 so that the toggle lever joint 6 releases the valve plate 8 so that extinguishing agent can flow out. It should be understood that other known heat sensitive trigger mechanisms could be used. The load axis 19 of the glass bulb 16 and the horizontal centerline of the body 1 are at an angle of approximately 90° to each other. It should be understood that other angles from 80° to 120° could also be used.

Advantageous designs are illustrated in FIG. 2 that show a setting unit 7 that can be used to set the force acting on the valve plate. Otherwise, the threaded connection of the disk 10 on the threaded connection of the sprinkler 5 and/or a set screw disposed against the glass bulb 16 can be used to apply a desired load force on the valve plate 8. A further advantageous design is illustrated by the drop pipe 2 in which the support pipe 4 is situated. Due to the support pipe 4, the force from the support 15 of the articulated connection 6.2 of the toggle-lever joint 6 is transmitted to the closure 17 at the sprinkler. By means of the support and drop pipes 3, 2 a distance between the body 1 and the sprinkler 5 can be set which may be necessary when installing an intermediate wall or for other reasons. A centering ring 18 is arranged at the end of the drop pipe 2 between the drop pipe 2 and the body 1.

LIST OF USED REFERENCE SYMBOLS

1 body
2 drop pipe
3 adapter
4 support pipe
5 sprinkler
6.1 articulated arm
6.2 articulated connection
6 toggle-lever joint
7 setting unit
8 valve plate
9 valve seat
10 disk
11 support of the toggle-lever joint at the valve plate 8
12 support of the toggle-lever joint at the body 1
13 support of the toggle-lever joint at the sprinkler 5
14 support of the toggle-lever joint at the setting unit 7
15 support of the toggle-lever joint at the support pipe 4
16 glass bulb
17 closure at the sprinkler
18 centering ring
19 load axis of the triggering element

What is claimed is:

1. A device for triggering a fire extinguishing system comprising:

a sprinkler having a passageway therethrough and a heat responsive triggering element supporting a closure within the passageway, a body adapted to be arranged between a pipe for an extinguishing agent and the sprinkler, and a multiple-armed toggle-lever joint (6) disposed within the body that acts between a load axis (19) of the triggering element of the sprinkler and a sealing element that is arranged at an angle of 80 to 120° relative to the load axis, wherein the multi-armed toggle-lever joint (6) includes at least four arms and at least four articulated connections (6.2) that connect respective ends of the at least four arms, the articulated connections being configured as single-point connections that act in the middle against their respective supports and wherein the sealing element, which closes off the pipe for the extinguishing agent in a gas-tight manner, is configured as a valve plate (8) against which the multi-armed toggle-lever joint (6) acts.

2. The device according to claim 1, wherein the angle between the load axis of the triggering element and the sealing element amounts to approximately 90°.

3. The device according to claim 1, wherein a setting unit (7) is arranged opposite the sealing element.

4. The device according to claim 1, wherein the toggle-lever joint (6) is a four-armed toggle-lever joint consisting of four articulated arms (6.1) and four articulated connections (6.2).

5. The device according to claim 4, wherein a first articulated connection (6.2) acts against the sealing element (8) and a second articulated connection (6.2) offset relative to the first articulated connection (6.2) by approximately 90° acts against the closure of the sprinkler (5).

6. The device according to claim 1, wherein a drop pipe (2) and a support pipe (4) are arranged between the sprinkler (5) and the toggle-lever joint (6).

7. The device according to claim 1, wherein the body is a T-shaped body.

8. The device according to claim 7, wherein an adapter (3) is arranged between the T-shaped body (1) and the pipe.

9. The device according to claim 1, wherein a drop pipe is arranged between the sprinkler and the body.

10. The device according to claim 1, wherein a support member is arranged between the toggle lever joint and the closure.

11. The device according to claim 1, wherein the sprinkler includes a deflector mounted thereon.

* * * * *

UNITED STATES PATENT AND TRADEMARK OFFICE

CERTIFICATE OF CORRECTION

PATENT NO. : 8,973,672 B2
APPLICATION NO. : 13/472043
DATED : March 10, 2015
INVENTOR(S) : Henning Fraederich It is certified that error appears in the above-identified patent and that said Letters Patent is hereby corrected as shown below:

On the Title Page:

At column 2, under (57) Abstract, line 6, please delete “80” and insert --80°-- therefor.

In the Specification:

At column 2, line number 20, please delete “openings,” and insert --openings-- therefor.

At column 4, line number 7, please delete “plate.” and insert --plate 8.-- therefor.

In the Claims:

At column 4, claim number 1, line number 57, please delete “80” and insert --80°-- therefor.

Signed and Sealed this
Thirtieth Day of June, 2015

Michelle K. Lee
*Director of the United States Patent and Trademark Office*